United States Patent [19]

Hicks

[11] 4,403,759

[45] Sep. 13, 1983

[54] CATHODIC CORROSION RESISTANT PIPE SADDLE WITH LOW FRICTION INSERT

[76] Inventor: Chester F. Hicks, 203 N. Main, Walbridge, Ohio 43465

[21] Appl. No.: 199,242

[22] Filed: Oct. 21, 1980

[51] Int. Cl.³ .............................................. F16L 3/16
[52] U.S. Cl. .................................. 248/55; 248/DIG. 1
[58] Field of Search .................... 248/49, 55, DIG. 1; 308/3 R, 3 C; 138/106

[56] References Cited

U.S. PATENT DOCUMENTS

| | | | |
|---|---|---|---|
| 2,005,699 | 6/1935 | Gottwald | 138/106 X |
| 3,315,927 | 4/1967 | Malloy et al. | 248/55 |
| 3,390,854 | 7/1968 | Sherburne | 248/55 |
| 3,472,474 | 10/1969 | Fountain | 248/55 |
| 3,788,581 | 1/1974 | Rutzick | 248/678 |
| 4,017,046 | 4/1977 | Hicks | 248/55 |

FOREIGN PATENT DOCUMENTS

| | | | |
|---|---|---|---|
| 672530 | 10/1963 | Canada | 248/55 |
| 1100927 | 5/1981 | Canada | 248/55 |
| 1530284 | 10/1978 | United Kingdom | 248/55 |

*Primary Examiner*—J. Franklin Foss
*Attorney, Agent, or Firm*—Wilson, Fraser, Barker & Clemens

[57] ABSTRACT

A pipe saddle has a pipe supporting cradle connected to a base portion by a web. This base portion includes flanges and is adapted to slidably rest on a supporting surface. Brackets mounting the flanges to the supporting surface permit the saddle to slide between the supporting surface and the brackets in the direction of the axis of the supported pipe, but restrict motion in all other directions. A relatively low coefficient of friction element is removably inserted in a cavity formed in the bottom of the base portion and extends below the bottom surface to engage the supporting surface. The pipe saddle can include a drain channel formed in the upper surface of the cradle and a slot formed in the web to accept a pipe strap.

4 Claims, 4 Drawing Figures

CATHODIC CORROSION RESISTANT PIPE SADDLE WITH LOW FRICTION INSERT

BACKGROUND OF THE INVENTION

1. Field of the Invention

The invention relates to a slidable saddle or support for long members such as beams or pipes which are subject to movement. In a typical application, such as in an oil pipeline, pipes are subjected to forces resulting from fluid moving within the pipes. Often during an initial surge of flow, the fluid motion within the pipe tends to twist the pipe. Lateral movements can also result from thermal expansion of pipes, or fluid hammering. It is often desirable to restrict most of such pipe movements, while permitting motion in the direction of the axis of the pipe.

2. Description of the Prior Art

Various slidable pipe saddles or supports are known in the prior art. For example, U.S. Pat. No. 3,315,927 to Malloy et al. discloses a pipe support comprising two relatively slidable carbon members. A tongue and groove arrangement can be employed to restrict sliding motion in one direction.

U.S. Pat. No. 3,472,474 to Fountain et al. discloses a pipe support comprising two relatively slidable carbon members, and straps securing the pipe to one of the support members.

U.S. Pat. No. 3,390,854 to Sherburne discloses a pipe support comprising a pedestal and a base member with a low friction element of polytetrafluoroethylene disposed between them.

SUMMARY OF THE INVENTION

A pipe saddle according to the present invention comprises a cradle section in the form of a cylindrical segment, a base portion, and a web portion connecting the cradle and base. The saddle may be integrally formed from glass fiber reinforced resins to resist cathodic corrosion between the pipe and a metal support. The bottom surface of the base portion, adapted to rest on a supporting surface, includes a recess into which a flow friction bearing element is press fitted.

The base portion includes flanges having generally upwardly facing surfaces. The pipe saddle may be retained on a supporting surface by brackets which overlie the flanges. Lateral, rotational, and vertical movements of the pipe saddle relative to the supporting surface are restricted by the engagement of the brackets and flange. However, the pipe saddle can move longitudinally, the flanges sliding between the supporting surface and the brackets.

It is an object of the present invention to provide a relatively inexpensive pipe saddle which includes an easily replaceable, low-friction insert.

It is a further object of the invention to provide a pipe saddle adapted for sliding motion on a supporting surface in the direction of the axis of the pipe being supported.

DESCRIPTION OF THE PREFERRED EMBODIMENTS

Figure 1:
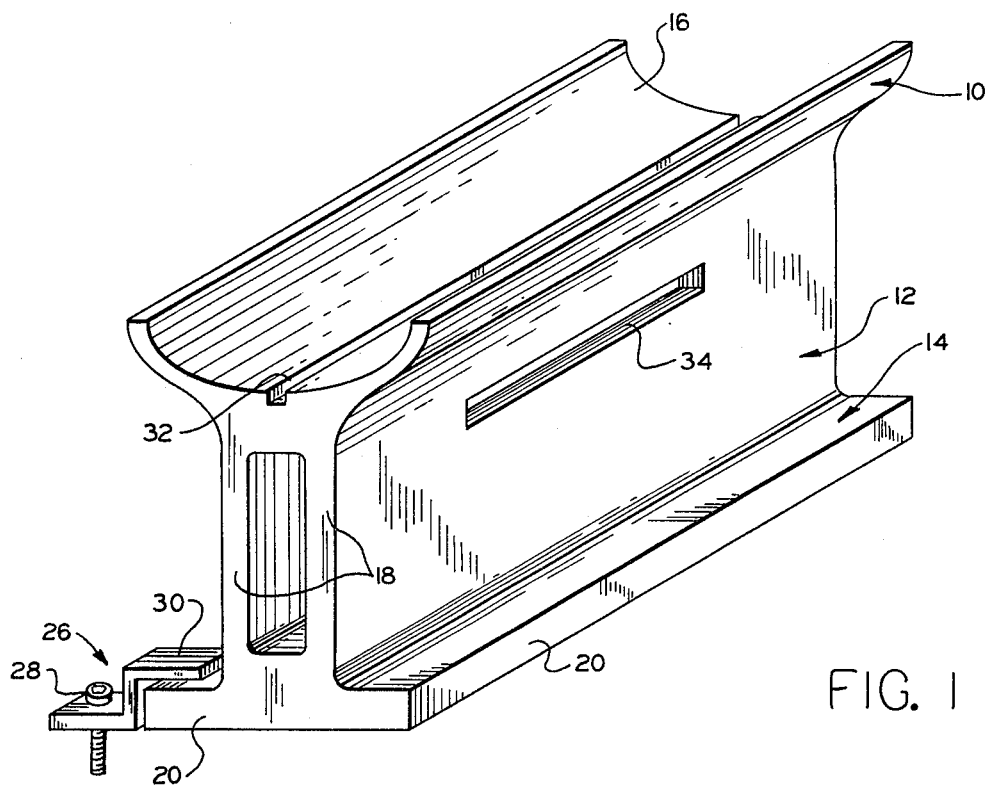
FIG. 1 is a perspective view of a pipe saddle embodying the invention.

Referring to FIG. 1, a pipe saddle embodying the present invention comprises a cradle 10 in the form of a right cylindrical segment. A web portion 12 connects the cradle 10 to a base portion 14. The saddle is preferably formed from a strong, light weight material, such as glass fiber reinforced resin. The saddle can be molded in a resin reinforced by chopped strands of glass fibers. A molded saddle can also be reinforced by application of a glass fiber fabric and additional resin to the molded article. Various suitable constructions are disclosed in U.S. Pat. No. 4,017,046.

The cylindrical cradle 10 has a concave, upwardly facing surface 16 having an arc radius to generally conform to the outer surface of the pipe to be supported. The longitudinal extent of the cradle portion 10 may be designed to suit the particular application, and load bearing requirements. If high temperature fluids are being carried, insulation (not shown) can be inserted between the pipe and the cradle such as SERATEX manufactured by Johns Manville.

The connecting web 12 is preferably not solid, but comprises two parallel, transversely spaced vertical walls 18. Compared with a single strut pedestal supporting member, the spaced apart walls 18 offer a more rigid, yet light weight supporting structure.

Figure 2:
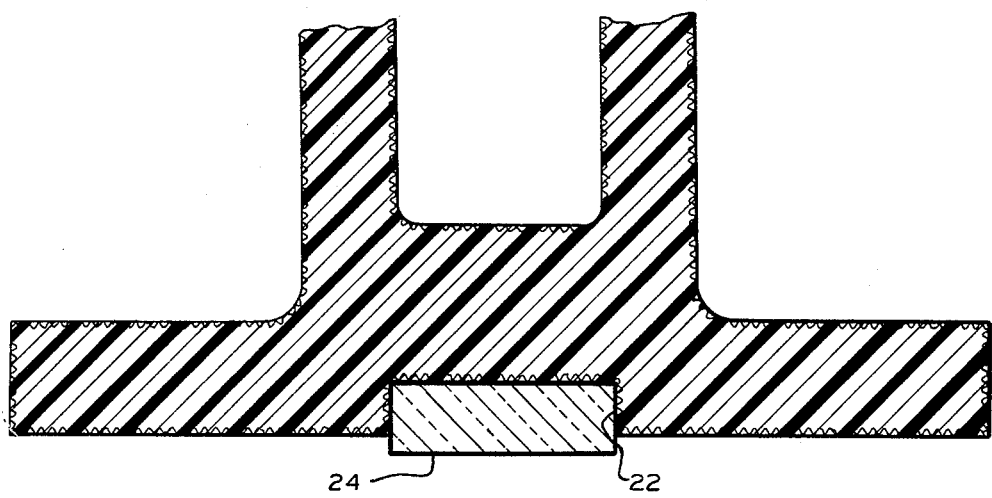
FIG. 2 is an enlarged scale, fragmantary sectional view of the lower portion of the pipe saddle illustrated in FIG. 1, showing the low friction insert.
Figure 4:
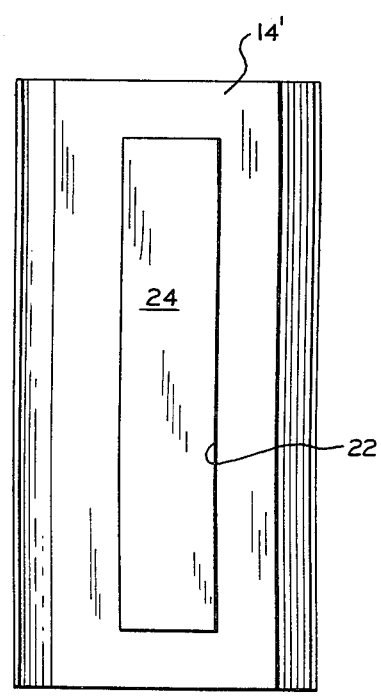
FIG. 4 is a bottom plan view of the pipe saddle illustrated in FIG. 3.

The base includes flanges 20 which extend outwardly from the lower portion of the web 12. As illustrated in FIGS. 2 and 4, the lower surface of the base 14 includes a shallow cavity 22 having walls perpendicular to the lower surface of the base 14. A relatively low friction bearing element 24 is press fitted within the cavity or recess 22. The bearing element 24 has a thickness somewhat greater than the depth of the cavity 22, hence it projects downwardly beyond the lower surface of the base 14. The material of the bearing element 24 can be polyethylene, nylon, or polytetrafluorethylene (Teflon), for example, which have relatively low coefficients friction with respect to a supporting surface.

In use, the pipe saddle is mounted on a flat supporting surface, with the low friction element 24 bearing on such surface. Due to the low coefficient friction between the bearing element 24 and the associated supporting surface, the pipe and saddle are free to move in response to thermal expansion of the pipe, or to thrust resulting from a surge of fluid within the pipe. Because of the extension of the bearing element 24 below the lower surface of the base 14, most or all of the load is carried by the bearing element 24. When worn, the bearing element 24 may be easily replaced, thus preserving the remaining portion of the saddle which reduces replacement costs.

In many instances, it is desirable to restrict lateral and vertical movement of a pipe saddle. To control the motion of the pipe saddle in this manner, the flanges 20 are adapted to cooperate with mounting brackets 26. As illustrated in FIG. 1, the brackets 26 are secured to the supporting surface (not shown) by suitable fasteners, such as bolts 28. The bracket 26 includes a leg 30 which overlies the flange 20. The flange 20 is thus restrained by the supporting surface below the flange 20 and the bracket 26 above the flange 20. Between the leg 30 and the supporting surface, a slot is defined for longitudinal movement of the flange 20, and thus of the pipe saddle. Therefore, the pipe saddle may slide in the direction of the axis of the supported pipe, but is restrained from motion in other directions.

Figure 3:
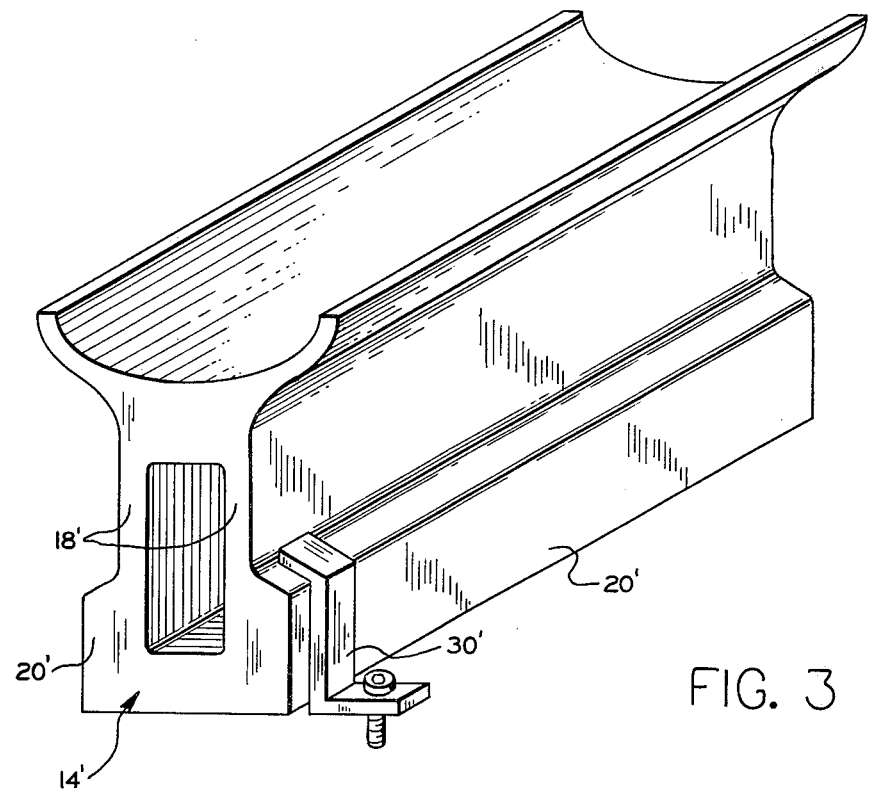
FIG. 3 is a perspective view of an alternate embodiment of the invention.

An alternative embodiment of the invention illustrated in FIG. 3 has a base portion 14' which includes flanges 20' which are narrower and thicker than the corresponding flanges 20 illustrated in FIG. 1. Complementary brackets 30' are shaped to conform to the outer surface of the flanges 20', thereby controlling the sliding motion of the pipe saddle, as already described. As illustrated in FIG. 4, a cavity 22 formed in the base 14', and an inserted bearing element 24 are also provided.

If no sliding motion of the pipe saddle is desired, the flanges 20 or 20' can be bolted to the supporting surface without the element 24. If the supporting surface is not leveled, a leveling stop nut and an associated lock nut may be utilized on bolts extending downwardly through holes (not shown) formed in the base 14 or 14' between the vertical walls 18 or 18' to space the lower surface of the base 14 or 14' from the supporting surface.

From the foregoing, it will be apparent that the invention provides a simple, reliable, inexpensive pipe saddle for applications in which sliding movement of the saddle is necessary. Allowing the saddle to slide on an existing supporting surface simplifies the design relative to two piece shiftable saddles. The member most subject to wear, the bearing element 24, is easily replaceable, thus reducing maintenance and replacement costs. The glass fiber reinforced structure provides adequate strength while minimizing cost and weight.

Referring again to FIG. 1, there is shown a longitudinally extending drain channel 32 formed in the upper surface 16 of the cradle 10. The bottom of the channel is formed higher at the center of the cradle than at the ends. Thus, when condensation forms on the underside of the pipe and/or the upper surface of the cradle, the liquid runs into the channel 32 and drains toward the open ends of the channel.

Each of the walls 18 has a longitudinally extending slot 34 formed approximately equidistant from the ends of the web portion 12 to accept a pipe strap (not shown) for securing the pipe to the saddle.

Although the invention has been described with reference to specific preferred embodiments, it should be understood that the invention may be practiced otherwise than as specifically illustrated and described without departing from its spirit or scope.

What is claimed is:

1. A pipe saddle for supporting a pipe above a supporting surface comprising:
   a cradle in the form of a segment of a right-circular cylinder;
   a pedestal for said saddle having an inverted T-shaped cross-section, said pedestal including a base portion and a web portion connecting said base portion and said cradle, said base portion having longitudinal flanges extending on either side of said web portion and said web portion having two parallel, transversely spaced apart longitudinal walls;
   a cavity formed in the bottom surface of said base adapted to removably retain a bearing element;
   a bearing element removably inserted in said cavity and protruding beyond the bottom surface of said base, said bearing element having a relatively low coefficient of friction with respect to the supporting surface on which it is adapted to be mounted;
   a plurality of brackets adapted to be secured to the supporting surface on which said bearing element is to be mounted, said brackets including portions adapted to overlie said flanges on said base such that vertical and lateral movement of said pipe saddle is restricted and sliding movement of said base between the supporting surface and said brackets in the direction of the longitudinal axis of said cradle is permitted;
   and
   a drain channel formed in an upper surface of said cradle for receiving condensation which forms on the pipe supported in said cradle, said drain channel extending parallel to the longitudinal axis of said cradle and having a bottom wall formed higher at the center of the cradle than at the ends.

2. The pipe saddle defined in claim 1 including a slot formed in said web portion adapted to accept a strap for securing the pipe to the saddle.

3. The pipe saddle defined in claim 2 including a slot formed in each of said walls of said web portion adapted to accept a strap for securing the pipe to the saddle.

4. A pipe saddle for supporting a pipe above a supporting surface comprising:
   a cradle in the form of a segment of a right-circular cylinder;
   a pedestal for said saddle having an inverted T-shaped cross-section, said pedestal including a base portion and a web portion connecting said base portion and said cradle, said base portion having longitudinal flanges extending on either side of said web portion and said web portion having two parallel, transversely spaced apart longitudinal walls, a slot being formed in each of said walls of said web portion adapted to accept a strap for securing the pipe to the saddle;
   a cavity formed in the bottom surface of said base adapted to removably retain a bearing element;
   a bearing element removably inserted in said cavity and protruding beyond the bottom surface of said base, said bearing element having a relatively low coefficient of friction with respect to the supporting surface on which it is adapted to be mounted;
   a plurality of brackets adapted to be secured to the supporting surface on which said bearing element is to be mounted, said brackets including portions adapted to overlie said flanges on said base such that vertical and lateral movement of said pipe saddle is restricted and sliding movement of said base between the supporting surface and said brackets in the direction of the longitudinal axis of said cradle is permitted;
   and
   a drain channel formed in an upper surface of said cradle for receiving condensation which forms on the pipe supported in said cradle, said drain channel extending parallel to the longitudinal axis of said cradle and having a bottom wall formed higher at the center of the cradle than at the ends.

* * * * *